United States Patent
Kwon et al.

(10) Patent No.: US 12,407,000 B2
(45) Date of Patent: Sep. 2, 2025

(54) FLEXIBLE ELECTRODE, SECONDARY BATTERY INCLUDING THE SAME, AND FLEXIBLE SECONDARY BATTERY

(71) Applicant: LG Chem, Ltd., Seoul (KR)

(72) Inventors: Yo-Han Kwon, Daejeon (KR); Sang-Young Lee, Ulsan (KR); Ju-Myung Kim, Ulsan (KR); In-Sung Uhm, Daejeon (KR); Jae-Hyun Lee, Daejeon (KR); Joonwon Lim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 999 days.

(21) Appl. No.: 17/285,006

(22) PCT Filed: Dec. 3, 2019

(86) PCT No.: PCT/KR2019/016960
§ 371 (c)(1),
(2) Date: Apr. 13, 2021

(87) PCT Pub. No.: WO2020/116912
PCT Pub. Date: Jun. 11, 2020

(65) Prior Publication Data
US 2021/0313587 A1    Oct. 7, 2021

(30) Foreign Application Priority Data

Dec. 3, 2018    (KR) .................. 10-2018-0153828

(51) Int. Cl.
*H01M 4/66*    (2006.01)
*H01M 4/62*    (2006.01)
(Continued)

(52) U.S. Cl.
CPC ....... *H01M 4/667* (2013.01); *H01M 10/0525* (2013.01); *H01M 10/647* (2015.04);
(Continued)

(58) Field of Classification Search
CPC .... H01M 4/667; H01M 10/647; H01M 50/46; H01M 10/0525; H01M 4/622; H01M 4/663; H01M 4/806
See application file for complete search history.

(56) References Cited

U.S. PATENT DOCUMENTS

2014/0370349 A1    12/2014    Kwon et al.
2014/0370351 A1    12/2014    Kwon et al.
(Continued)

FOREIGN PATENT DOCUMENTS

CN    104466093 A    3/2015
CN    104466191 A    3/2015
(Continued)

OTHER PUBLICATIONS

KR20170028111A—Machine Translation (Year: 2017).*
(Continued)

*Primary Examiner* — Brian R Ohara
*Assistant Examiner* — Patrick Marshall Greene
(74) *Attorney, Agent, or Firm* — Lerner David LLP

(57) ABSTRACT

A flexible electrode includes: a current collector; an electrode layer positioned at a top of the current collector; a first support layer positioned at a top of the electrode layer; and a second support layer positioned at a bottom of the current collector, wherein each of the first support layer and the second support layer is a conductive coating layer-containing porous polymer substrate including a porous polymer substrate, and a conductive coating layer positioned on a surface of the porous polymer substrate and including a conductive material and a dispersing agent, and the porous polymer substrate is a non-woven web provided with a plurality of polymer fibers and a pore structure interconnected by the plurality of polymer fibers.

19 Claims, 5 Drawing Sheets

(51) Int. Cl.
*H01M 4/80* (2006.01)
*H01M 10/0525* (2010.01)
*H01M 10/647* (2014.01)
*H01M 50/46* (2021.01)

(52) U.S. Cl.
CPC ............ *H01M 50/46* (2021.01); *H01M 4/622* (2013.01); *H01M 4/663* (2013.01); *H01M 4/806* (2013.01)

(56) References Cited

U.S. PATENT DOCUMENTS

| | | | |
|---|---|---|---|
| 2014/0377611 | A1 | 12/2014 | Kwon et al. |
| 2014/0377619 | A1 | 12/2014 | Kwon et al. |
| 2015/0144199 | A1 | 5/2015 | Huh et al. |
| 2015/0360409 | A1 | 12/2015 | Liu et al. |
| 2016/0159667 | A1 | 6/2016 | Hwang et al. |
| 2017/0250448 | A1* | 8/2017 | Kwon ................ H01M 10/052 |
| 2018/0254462 | A1 | 9/2018 | Kwon et al. |
| 2020/0235385 | A1 | 7/2020 | Kim |

FOREIGN PATENT DOCUMENTS

| | | |
|---|---|---|
| CN | 105186005 A | 12/2015 |
| CN | 107394118 A | 11/2017 |
| JP | 2015519711 A | 7/2015 |
| KR | 20130132301 A | 12/2013 |
| KR | 20140132294 A | 11/2014 |
| KR | 20150140619 A | 12/2015 |
| KR | 20160043939 A | 4/2016 |
| KR | 101621745 B1 | 5/2016 |
| KR | 101628901 B1 | 6/2016 |
| KR | 20160062617 A | 6/2016 |
| KR | 101653164 B1 | 9/2016 |
| KR | 20170028110 A | 3/2017 |
| KR | 20170028111 A * | 3/2017 |
| KR | 20170030087 A | 3/2017 |
| KR | 101775098 B1 | 9/2017 |
| KR | 20180036564 A | 4/2018 |

OTHER PUBLICATIONS

Extended European Search Report including Written Opinion for Application No. 19892268.4 dated Dec. 6, 2021, pp. 1-10.
International Search Report for PCT/KR2019/016960 mailed Mar. 25, 2020; 3 pages.
Search Report dated Jun. 13, 23 from Office Action for Chinese Application No. 201980079746 dated Jun. 15, 23. (see p. 1-2, categorizing the cited references).

* cited by examiner

FLEXIBLE ELECTRODE, SECONDARY BATTERY INCLUDING THE SAME, AND FLEXIBLE SECONDARY BATTERY

CROSS-REFERENCE TO RELATED APPLICATIONS

The present application is a national phase entry under 35 U.S.C. § 371 of International Application No. PCT/KR2019/016960, filed on Dec. 3, 2019, published in Korean, which claims priority to Korean Patent Application No. 10-2018-0153828 filed on Dec. 3, 2018 in the Republic of Korea, the disclosures of which are incorporated herein by reference.

TECHNICAL FIELD

The present disclosure relates to a flexible electrode, a secondary battery including the same, and a flexible secondary battery. More particularly, the present disclosure relates to a flexible electrode which is prevented from detachment of an electrode active material layer and has improved flexibility and electrical conductivity, a secondary battery including the same, and flexible secondary battery.

BACKGROUND ART

A secondary battery refers to a device which converts external electric energy into the form of chemical energy, stores the chemical energy therein and generates electricity as necessary. Such a secondary battery allows repeated charging, and thus is also called 'rechargeable battery'. Currently used secondary batteries include lead storage batteries, nickel cadmium (NiCd) batteries, nickel metal hydride storage (NiMH) batteries, lithium ion (Li-ion) batteries and lithium ion (Li-ion) polymer batteries. Such secondary batteries provide both an economical advantage and an eco-friendly advantage, as compared to disposable primary batteries.

Currently, secondary batteries are used for applications requiring low electric power. Such applications include instruments that help start-up of cars, portable devices/tools and uninterruptable power supplies. Recently, since development of wireless communication technology leads popularization of portable devices and tends to convert many kinds of conventional devices into wireless devices, secondary batteries are increasingly in demand. In addition, hybrid vehicles and electric vehicles have been commercialized with a view to preventing environmental pollution and such next-generation vehicles use secondary batteries to reduce the cost and weight and to improve the service life.

In general, lithium secondary batteries are provided largely in the form of cylindrical batteries, prismatic batteries or pouch-type batteries. This is because a secondary battery is obtained by installing an electrode assembly including a negative electrode, a positive electrode and a separator inside of a cylindrical or prismatic metallic can or a pouch-type casing made of an aluminum laminate sheet, and injecting an electrolyte to the electrode assembly. Therefore, a predetermined space for installing the secondary battery is required essentially, and such cylindrical, prismatic or pouch-like shapes of secondary batteries undesirably function as a limitation in developing portable systems having various shapes. Thus, there has been a need for developing a novel type of secondary battery which allows easy deformation.

To meet such a need, there has been suggested a flexible secondary battery having a significantly larger length as compared to its sectional diameter. Such a flexible secondary battery causes detachment of an electrode active material layer due to stress caused by external force derived from a change in shape or rapid volume swelling of the electrode active material during charge/discharge, resulting in a decrease in capacity and degradation of cycle life characteristics.

To solve the above-mentioned problems, in the case of a composite type electrode (active material/conductive material/binder), it may have flexibility against bending or distortion, when the binder content contained in the electrode layer is increased. However, such an increase in binder content in the electrode layer causes an increase in electrode resistance, resulting in degradation of battery performance. In addition, in the case of application of severe external force, such as perfect folding of the electrode, the composite type electrode shows a limitation in flexibility by itself to cause detachment of the electrode. Further, when the electrode layer has high adhesion to the current collector, cracking is generated in the electrode layer in the vertical direction of the current collector to cause a short-circuit in the electrode layer. Thus, there still is a need for an electrode having improved flexibility and electrical conductivity.

DISCLOSURE

Technical Problem

The present disclosure is designed to solve the problems of the related art, and therefore the present disclosure is directed to providing a flexible electrode, which reduces cracking generated in an electrode active material layer, even when external force is applied to the electrode active material layer, prevents detachment of the electrode active material layer from the current collector, even when cracking occurs severely, and has improved flexibility and electrical conductivity. The present disclosure is also directed to providing a secondary battery including the flexible electrode and a flexible secondary battery.

Technical Solution

To solve the above-mentioned technical problems, there are provided embodiments of a flexible electrode, a method for manufacturing the same, and a secondary battery including the flexible electrode.

According to the first embodiment of the present disclosure, there is provided a flexible electrode, including:
 a current collector;
 an electrode layer positioned at a top of the current collector;
 a first support layer positioned at a top of the electrode layer; and
 a second support layer positioned at a bottom of the current collector,
 wherein each of the first support layer and the second support layer is a conductive coating layer-containing porous polymer substrate including:
 a porous polymer substrate, and a conductive coating layer positioned on a surface of the porous polymer substrate and including a conductive material and a dispersing agent, and
 the porous polymer substrate is a non-woven web provided with a plurality of polymer fibers and a pore structure interconnected by the plurality of polymer fibers.

According to the second embodiment of the present disclosure, there is provided the flexible electrode as defined in the first embodiment, which further includes a second electrode layer between the current collector and the second support layer.

According to the third embodiment of the present disclosure, there is provided the flexible electrode as defined in the first or the second embodiment, wherein the current collector is a porous current collector, or a current collector having a plurality of dented portions having a continuous or discontinuous pattern.

According to the fourth embodiment of the present disclosure, there is provided the flexible electrode as defined in any one of the first to the third embodiments, wherein the plurality of polymer fibers includes polyethylene terephthalate, polyimide, polyamide, polysulfone, polyvinylidene fluoride, polyacrylonitrile, polyethylene, polypropylene, polyetherimide, polyvinyl alcohol, polyethylene oxide, polyacrylic acid, polyvinyl pyrrolidone, agarose, alginate, polyvinylidene hexafluoropropylene, polyurethane, polypyrrole, poly3,4-ethylenedioxythiophene, polyaniline, a derivative thereof, or a mixture of two or more thereof.

According to the fifth embodiment of the present disclosure, there is provided the flexible electrode as defined in any one of the first to the fourth embodiments, wherein the conductive material includes carbon nanotubes, graphene, reduced graphene oxide, transition metal carbide, carbon black, acetylene black, Ketjen black, carbon fibers, polypyrrole, poly3,4-ethylenedioxythiophene, polyaniline, or a mixture of two or more thereof.

According to the sixth embodiment of the present disclosure, there is provided the flexible electrode as defined in any one of the first to the fifth embodiments, wherein a content of the dispersing agent is 0.1-20 parts by weight based on 100 parts by weight of the conductive material.

According to the seventh embodiment of the present disclosure, there is provided a method for manufacturing a flexible electrode, including the steps of:
  applying electrode active material slurry to a top of a current collector, followed by drying, to form an electrode layer;
  forming a first support layer at a top of the electrode layer; and
  forming a second support layer at a bottom of the current collector,
  wherein each of the first support layer and the second support layer is a conductive coating layer-containing porous polymer substrate obtained by:
  spinning a polymer solution to form a porous polymer substrate including a plurality of polymer fibers and a pore structure interconnected by the plurality of polymer fibers, while spinning a colloidal solution containing a conductive material dispersed therein and a dispersing agent at the same time so that the conductive material may be positioned on a surface of the porous polymer substrate, thereby forming a conductive coating layer.

According to the eighth embodiment of the present disclosure, there is provided the method for manufacturing a flexible electrode as defined in the seventh embodiment, which further includes a step of applying electrode active material slurry to the bottom of the current collector, followed by drying, to form an electrode layer, before forming the second support layer at the bottom of the current collector.

According to the ninth embodiment of the present disclosure, there is provided a secondary battery including a positive electrode, a negative electrode, and a separator interposed between the positive electrode and the negative electrode, wherein at least one of the positive electrode and the negative electrode is the flexible electrode as defined in any one of the first to the sixth embodiments.

According to the tenth embodiment of the present disclosure, there is provided the secondary battery as defined in the ninth embodiment, which is a stacked battery, a wound battery, a stacked/folded battery, or a flexible battery.

According to the eleventh embodiment of the present disclosure, there is provided a flexible secondary battery including:
  an internal electrode;
  a separator layer surrounding an outside of the internal electrode; and
  an external electrode helically wound to surround an outside of the separator layer,
  wherein at least one of the internal electrode and the external electrode is the flexible electrode as defined in any one of the first to the sixth embodiments.

According to the twelfth embodiment of the present disclosure, there is provided the flexible secondary battery as defined in the eleventh embodiment, wherein the flexible electrode has a strip structure extended in one direction.

According to the thirteenth embodiment of the present disclosure, there is provided the flexible secondary battery as defined in the eleventh or the twelfth embodiment, wherein the internal electrode has a hollow structure having a space therein.

According to the fourteenth embodiment of the present disclosure, there is provided the flexible secondary battery as defined in any one of the eleventh to the thirteenth embodiments, wherein the internal electrode includes at least one flexible electrode wound helically.

According to the fifteenth embodiment of the present disclosure, there is provided the flexible secondary battery as defined in any one of the eleventh to the fourteenth embodiments, wherein an internal electrode current collector core portion, a lithium ion-supplying core portion containing an electrolyte, or a filler core portion may be formed in the space formed inside the hollow structure of the internal electrode.

According to the sixteenth embodiment of the present disclosure, there is provided the flexible secondary battery as defined in the fifteenth embodiment, wherein a lithium ion-supplying core portion containing an electrolyte is formed in the space formed inside the hollow structure of the internal electrode, and the lithium ion-supplying core portion includes a gel polymer electrolyte and a support, or a liquid electrolyte and a porous carrier.

According to the seventeenth embodiment of the present disclosure, there is provided the flexible secondary battery as defined in any one of the eleventh to the sixteenth embodiments, which further includes a protective coating formed to surround an outside of the external electrode.

According to the eighteenth embodiment of the present disclosure, there is provided a flexible secondary battery, including:
  a lithium ion-supplying core portion containing an electrolyte;
  an internal electrode formed to surround an outside of the lithium ion-supplying core portion;
  a separator layer surrounding an outside of the internal electrode; and
  an external electrode helically wound to surround an outside of the separator layer, wherein at least one of the internal electrode and the external electrode is the flexible electrode as defined in any one of the first to the sixth embodiments.

According to the nineteenth embodiment of the present disclosure, there is provided a flexible secondary battery including:

two or more internal electrodes disposed in parallel with each other;

a separator layer surrounding an outside of the two or more internal electrodes at once; and an external electrode helically wound to surround an outside of the separator layer, wherein at least one of the two or more internal electrode and the external electrode is the flexible electrode as defined in any one of the first to the sixth embodiments.

According to the twentieth embodiment of the present disclosure, there is provided a flexible secondary battery, including:

two or more lithium ion-supplying core portions each containing an electrolyte;

two or more internal electrodes formed to surround an outside of the two or more lithium ion-supplying core portions, respectively, the two or more internal electrodes disposed in parallel with each other;

a separator layer surrounding the outsides of the two or more internal electrodes at once; and an external electrode helically wound to surround an outside of the separator layer, wherein at least one of the two or more internal electrodes and the external electrode is the flexible electrode as defined in any one of the first to the sixth embodiments.

Advantageous Effects

The flexible electrode according to an embodiment of the present disclosure includes a porous polymer substrate as a support layer on at least one surface of the electrode layer. In this manner, the support layer may function as a buffer region which prevents detachment of the electrode layer upon bending of the electrode, and thus can contribute to improvement of electrode flexibility. In addition, the flexible electrode has a porous structure which allows free introduction of an electrolyte and has pores to be impregnated with an electrolyte. Thus, it is possible to improve lithium ion transportability.

The support layer applied to the flexible electrode according to an embodiment of the present disclosure is a conductive coating layer-containing porous polymer substrate, which includes a conductive coating layer positioned on the surface of the porous polymer substrate and containing a conductive material. As a result, such a conductive coating layer-containing porous polymer substrate can minimize an increase in electrode resistance by virtue of electric connection between electrode layers separated by cracking, even if cracking occurs in the electrode. Therefore, the secondary battery including the flexible electrode according to an embodiment of the present disclosure is prevented from a decrease in battery capacity and shows improved cycle life characteristics.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Figure 1:
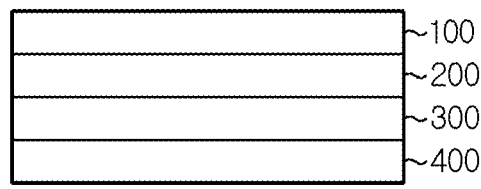
FIG. 1 is a sectional view illustrating the flexible electrode according to an embodiment of the present disclosure.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

In addition, the description proposed herein is just a preferable example for the purpose of illustrations only, not intended to limit the scope of the disclosure, so it should be understood that other equivalents and modifications could be made thereto without departing from the scope of the disclosure.

As used herein, the expression 'one portion is connected to another portion' covers not only 'a portion is directly connected to another portion' but also 'one portion is connected electrically to another portion' by way of the other element interposed between them.

Throughout the specification, the expression 'one member is positioned at the "top", "bottom" or "outside" of another member' means that one member is in contact with one surface of another member, as well as that the other member is present between the two members. In addition, the expression 'one member is positioned at the "top" or "bottom" of another member' merely illustrates the positional relationship of one member based on another member, wherein the positional relationship is not interpreted as a fixed positional relationship of top or bottom, but one member may be positioned at the bottom or top of another member when viewed based on another member.

Throughout the specification, the expression 'a part includes an element' does not preclude the presence of any additional elements but means that the part may further include the other elements. As used herein, the terms 'approximately', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

In one aspect, there is provided a flexible electrode, including:

a current collector; an electrode layer positioned at the top of the current collector; a first support layer positioned at the top of the electrode layer; and a second support layer positioned at the bottom of the current collector, wherein each of the first support layer and the second support layer is a conductive coating layer-containing porous polymer substrate, the conductive coating layer-containing porous polymer substrate includes a porous polymer substrate, and a conductive coating layer positioned on the surface of the porous polymer substrate and including a conductive material and a dispersing agent, and the porous polymer substrate is a non-woven web provided with a plurality of polymer fibers formed by electrospinning and a pore structure interconnected by the polymer fibers.

Figure 2:
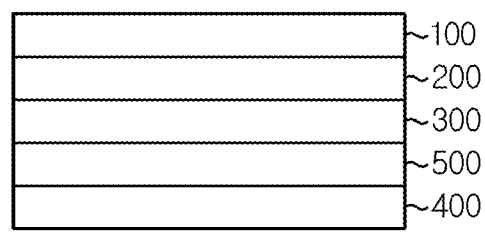
FIG. 2 is a sectional view illustrating the flexible electrode according to an embodiment of the present disclosure.

FIG. 1 and FIG. 2 are sectional views illustrating the flexible electrode according to an embodiment of the present disclosure.

Referring to FIG. 1, the flexible electrode 10 according to an embodiment of the present disclosure includes: a current collector 300; an electrode layer 200 positioned at the top of the current collector 300; a first support layer 100 positioned at the top of the electrode layer 200; and a second support layer 400 positioned at the bottom of the current collector 300.

In addition, referring to FIG. 2, the flexible electrode 20 may further include an electrode layer 500 between the current collector 300 and the second support layer 400. Therefore, the flexible electrode 20 according to an embodiment of the present disclosure includes: a second support layer 400; an electrode layer 500 positioned at the top of the second support layer 400; a current collector 300 positioned at the top of the electrode layer 500; an electrode layer 200 positioned at the top of the current collector 300; and a first support layer 100 positioned at the top of the electrode layer 200.

To manufacture a flexible battery, it is required to ensure the flexibility of an electrode sufficiently. However, the conventional flexible secondary battery as an example of a flexible battery causes detachment of an electrode active material layer due to the stress caused by external force during shape deformation, or rapid volume swelling of the electrode active material layer during charge/discharge cycles, when using a high-capacity Si- or Sn-based negative electrode active material, resulting in a decrease in battery capacity and degradation of cycle life characteristics. When the content of a binder contained in the electrode active material is increased to overcome such problems, the electrode may have flexibility against bending or distortion.

However, such an increase in binder content of the electrode active material layer causes an increase in electrode resistance, resulting in degradation of battery performance. When severe external force is applied, for example, upon complete folding of the electrode, it is not possible to prevent detachment of the electrode active material layer even though the binder content is increased. Thus, this cannot be a suitable solution.

Thus, according to an embodiment of the present disclosure, the above-mentioned problem have been solved by forming the first porous support layer 100 at the top of the electrode layer 200, applying the first support layer 100 as a conductive coating layer-containing porous polymer substrate, and applying the second support layer 400 that may be formed at the bottom of the current collector 300 or electrode layer 500 also as a conductive coating layer-containing porous polymer substrate so that the flexibility and electrical conductivity of the electrode may be maximized.

In other words, the first support layer 100 and the second support layer 400, each of which is a conductive coating layer-containing porous polymer substrate and has a buffering effect as a buffering region relieving external force applied to the electrode layer 200, even when external force of bending or distortion is applied to the electrode, and thus prevent detachment of the electrode layer 200 to improve the flexibility of the electrode.

In addition, the first support layer 100 and the second support layer 400 allows free introduction of an electrolyte and has a porous structure whose pores may be impregnated with the electrolyte, and thus can contribute to improvement of lithium ion transportability.

According to the related art, a method of coating a polymer solution to form a support layer has been used. However, in this case, there is a limitation in preventing cracking in an electrode and detachment of an electrode layer upon external bending, while minimizing electrode resistance.

Further, when forming a porous polymer substrate (nonwoven web) layer on an electrode layer by using a polymer- or conductive material-containing polymer layer as an adhesive layer, the polymer and nonwoven web function as electrical insulators as they are, thereby affecting degradation of electrical conductivity. When using a conductive material in the form of a composite with a polymer to ensure electrical conductivity, there is a clear limitation in improving the electrical conductivity. In addition, it is thought that a nonwoven web is a porous membrane and has high ion conductivity. However, it is highly likely that the polymer layer functioning as an adhesive layer or a conductive material-containing polymer layer rather blocks the pores of nonwoven web.

Under these circumstances, according to the present disclosure, the 'polymer layer' or 'conductive material-containing polymer' layer functioning as an adhesive layer between the porous polymer substrate and the electrode layer is eliminated to solve the above-mentioned problems causing degradation of battery performance.

Meanwhile, when introducing a porous substrate alone as a support layer, the porous substate itself has significantly low electrical conductivity, and particularly, the active material has low conductivity. Thus, in this case, electrode resistance is increased, resulting in severe degradation of battery performance.

To reduce such electrode resistance, the conductive coating layer-containing porous polymer substrate applied to the first support layer and the second support layer according to the present disclosure includes a conductive coating layer provided with a conductive material and a dispersing agent, and positioned on the surface of the porous polymer substrate.

Herein, the surface of the porous polymer substrate means the surfaces of a plurality of polymer fibers positioned on the surface portion of the porous polymer substate and exposed to the outside. The expression 'the conductive coating layer is positioned on the surface of the porous polymer substrate' covers that the conductive coating layer is positioned on the surfaces of a plurality of polymer fibers positioned on the surface portion of the porous polymer substrate and exposed to the outside, and optionally that the conductive coating layer is positioned in at least a part of the pore portions positioned on the surface portion of the porous polymer substrate and exposed to the outside.

In addition, the conductive coating layer does not further include a binder that may cause an increase in electrical resistance. However, since the colloidal solution for forming the conductive coating layer includes a small amount of dispersing agent to improve dispersibility of the conductive material, in addition to the conductive material and dispersion medium, the conductive coating layer includes a conductive material and a small amount of dispersing agent.

When forming the porous polymer substrate through a spinning process, the solvent can function as an adhesive, since it is present in the polymer substrate through swelling and is present on the surface. Therefore, unlike the conventional conductive polymer coating layer including a significant amount of binder, the conductive coating layer can be formed stably on the surface of the porous polymer substrate merely by incorporating a small amount of dispersing agent to the colloidal solution of the conductive material to impart dispersibility.

The dispersing agent may function to disperse the conductive material more homogeneously in the dispersion medium in the colloidal solution containing the conductive material dispersed therein for forming the conductive coating layer. The content of the dispersing agent may be 0.1-20 parts by weight, 1-10 parts by weight, or 1-5 parts by weight, based on 100 parts by weight of the conductive material. When the content of the dispersing agent satisfies the above-defined range, it is possible to improve dispersibility of the conductive material in the colloidal solution, to carry out spinning of the colloidal solution containing the conductive material dispersed therein easily onto the surface of the porous polymer substrate so that the conductive coating layer may be formed, and to prevent the problem of an increase in resistance, which occurs when a significantly large amount of binder polymer is used based on the conductive material in the case of the conductive coating layer according to the related art.

According to an embodiment of the present disclosure, particular examples of the dispersing agent include polyvinyl pyrrolidone, poly3,4-ethylenedioxythiophene, polyacrylic acid, carboxymethyl cellulose, or at least two of them.

The current collector functions to collect electrons generated by electrochemical reactions or to supply electrons required for electrochemical reactions. The current collector may be made of stainless steel, aluminum, nickel, titanium, baked carbon or copper; stainless steel surface-treated with carbon, nickel, titanium or silver; aluminum-cadmium alloy; non-conductive polymer surface-treated with a conductive material; conductive polymer; metal paste including metal powder such as Ni, Al, Au, Ag, Pd/Ag, Cr, Ta, Cu, Ba or ITO; or carbon paste including carbon powder, such as graphite, carbon black or carbon nanotubes.

As described above, when external force, such as bending or distortion, is applied to a secondary battery, the electrode active material layer may be detached from the current collector. Therefore, a large amount of binder is incorporated to the electrode active material layer for the purpose of the flexibility of the electrode. However, such a large amount of binder causes swelling with an electrolyte so that it may be detached from the current collector with ease, resulting in degradation of battery performance.

Therefore, in order to improve the adhesion between the electrode active material layer and the current collector, the current collector 300 may further include a primer coating layer including a conductive material and a binder.

Herein, the conductive material may include any one selected from the group consisting of carbon black, acetylene black, Ketjen black, carbon fibers, carbon nanotubes and graphene, or a mixture of at least two of them, but is not limited thereto.

The binder may include any one selected from the group consisting of polyvinylidene fluoride (PVdF), polyvinylidene fluoride-co-hexafluoropropylene, polyvinylidene fluoride-co-trichloroethylene, polybutyl acrylate, polymethyl methacrylate, polyacrylonitrile, polyvinylpyrrolidone, polyvinyl acetate, polyethylene-co-vinyl acetate, polyethylene oxide, polyarylate, cellulose acetate, cellulose acetate butyrate, cellulose acetate propionate, cyanoethyl pullulan, cyanoethyl polyvinylalcohol, cyanoethyl cellulose, cyanoethyl sucrose, pullulan, carboxymethyl cellulose, styrene-butadiene rubber, acrylonitrile-styrene-butadiene copolymer and polyimide, or a mixture of at least two of them, but is not limited thereto.

According to an embodiment of the present disclosure, the current collector may be a porous current collector; or a current collector having a plurality of dented portions having a continuous or discontinuous pattern.

Figure 4A:
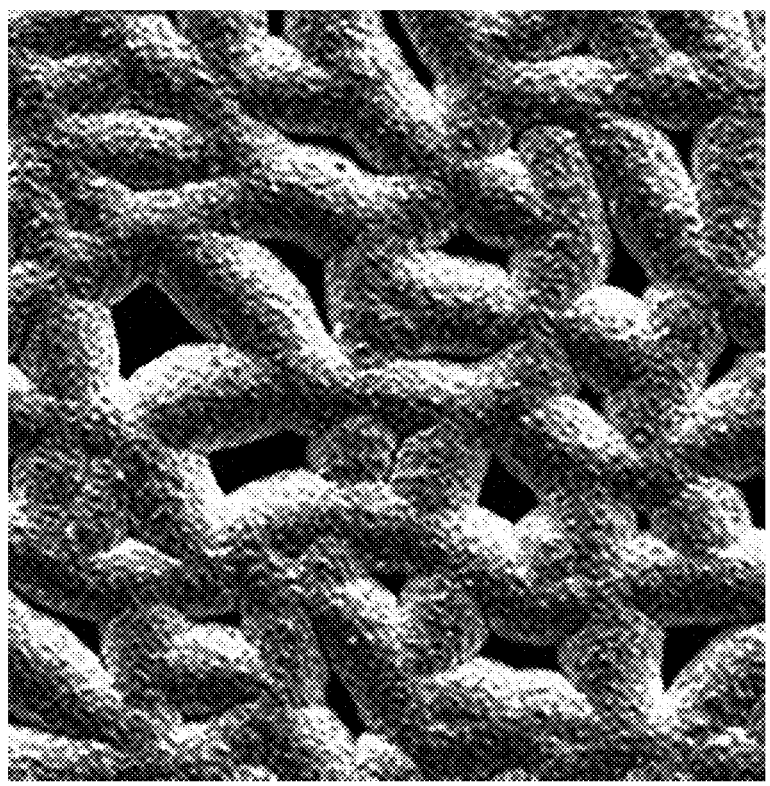
FIG. 4a shows the surface of a meshed current collector according to an embodiment of the present disclosure.

The porous current collector refers to a current collector having an open structure through which lithium ions can be transmitted, and particular examples thereof include a meshed current collector, punched current collector, expanded current collector, or the like. FIG. 4a shows the surface of a meshed current collector according to an embodiment of the present disclosure. In addition, the punched current collector is an example of porous current collector and may have a structure having a plurality of through-holes.

Figure 4B:
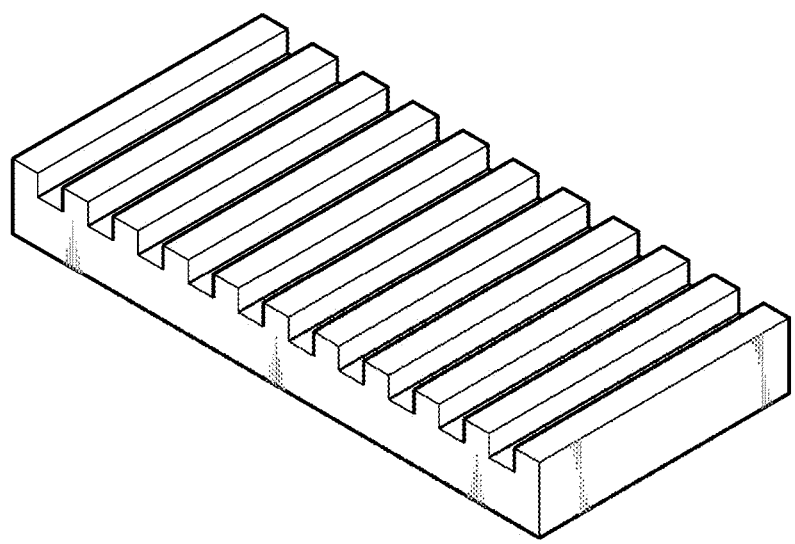
FIG. 4b is a schematic view illustrating the surface of the current collector having a plurality of dented portions according an embodiment of the present disclosure.
Figure 4C:
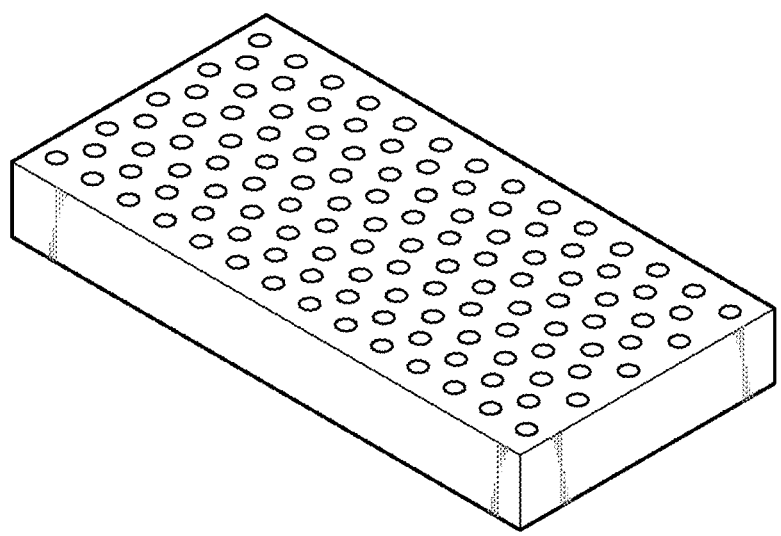
FIG. 4c is a schematic view illustrating the surface of the current collector having a plurality of dented portions according an embodiment of the present disclosure.

FIG. 4b is a schematic view illustrating the surface of the current collector having a plurality of dented portions according an embodiment of the present disclosure, and FIG. 4c is a schematic view illustrating the surface of the current collector having a plurality of dented portions according an embodiment of the present disclosure. Particularly, the current collector as shown in FIG. 4b is a current collector which has a plurality of dented portions formed on at least one surface thereof in order to further increase the surface area of the current collector. Herein, the dented portions may have a continuous pattern or a discontinuous pattern. In other words, the current collector may have a continuous pattern of dented portions formed in the longitudinal direction, while being spaced from each other (line shape, FIG. 4b), or a discontinuous pattern in which a plurality of dented portions (grooves) is arranged (groove shape, FIG. 4c).

The sections of the dented portions or holes may have a circular shape or polygonal shape.

According to an embodiment of the present disclosure, when the electrode layers are provided on both surfaces of a porous current collector (e.g. meshed current collector), about 0.5 times of electrode loading amount may be applied to both surfaces of the porous current collector, as compared to the same electrode loading amount of the electrode layer formed on a single surface of the porous current collector. In addition, since the porous current collector has an open structure, lithium ions can be transported freely through the structure. Thus, even when the counter electrode is disposed only at one side of the porous current collector electrode (battery having one sheet of negative electrode and positive electrode), both electrode layers present on both surfaces of the porous current collector can participate in reaction. Therefore, when the electrode layers are provided on both surfaces of the porous current collector having an open structure, it is possible to effectively reduce electrode resistance caused by a high electrode loading amount (or large electrode thickness).

When the flexible electrode is a negative electrode, the negative electrode active material applied to the electrode layer may include any one active material particle selected from the group consisting of natural graphite, artificial graphite and carbonaceous materials; metals (Me), such as lithium-containing titanium composite oxide (LTO), Si, Sn, Li, Zn, Mg, Cd, Ce, Ni or Fe; alloys of the metals (Me); oxides of the metals (Me); and composites of the metals (Me) with carbon, or a mixture of at least two of them. When the flexible electrode is a positive electrode, the positive electrode active material applied to the electrode layer may be any one active material particle selected from the group consisting of $LiCoO_2$, $LiNiO_2$, $LiMn_2O_4$, $LiCoPO_4$, $LiFePO_4$, $LiNiMn\ CoO_2$ and $LiNi_{1-x-y-z}\ Co_xM1_yM2_zO_2$ (wherein each of M1 and M2 independently represents any one selected from the group consisting of Al, Ni, Co, Fe, Mn, V, Cr, Ti, W, Ta, Mg and Mo, each of x, y and z independently represents an atomic proportion of an element forming the oxides, and $0 \leq x < 0.5$, $0 \leq y < 0.5$, $0 \leq z < 0.5$, $0 < x+y+z \leq 1$), or a mixture of at least two of them.

In addition, a binder polymer is used to interconnect and fix the active material particles in the electrode layer. The binder polymer may be any one selected from the group consisting of polyvinylidene fluoride (PVdF), polyvinylidene fluoride-co-hexafluoropropylene, polyvinylidene fluoride-co-trichloroethylene, polybutyl acrylate, polymethyl methacrylate, polyacrylonitrile, polyvinylpyrrolidone, polyvinyl acetate, polyethylene-co-vinyl acetate, polyethylene oxide, polyarylate, cellulose acetate, cellulose acetate butyrate, cellulose acetate propionate, cyanoethyl pullulan, cyanoethyl polyvinylalcohol, cyanoethyl cellulose, cyanoethyl sucrose, pullulan, carboxymethyl cellulose, styrene-butadiene rubber, acrylonitrile-styrene-butadiene copolymer and polyimide, or a mixture of at least two of them, but is not limited thereto.

Herein, each of the first support layer and the second support layer is a conductive coating layer-containing porous polymer substrate.

The conductive coating layer-containing porous polymer substrate includes a porous polymer substrate, and a conductive coating layer positioned on the surface of the porous polymer substrate and provided with a conductive material and a dispersing agent.

The porous polymer substrate may be a nonwoven web including a plurality of polymer fibers formed by spinning and a pore structure interconnected by the polymer fibers.

The porous polymer substrate may have a thickness of 0.1-100 μm, and the diameter of the polymer fibers forming the porous polymer substrate, i.e. nonwoven web formed by electrospinning may be 0.01-100 μm. The pore size in the porous polymer substrate may be 0.001-100 μm, or 0.01-10 μm, and the porosity may be 5-95%.

The conductive coating layer-containing porous polymer substrate used for the first support layer and the second support layer has a porous structure, and thus facilitates introduction of an electrolyte to the electrode layer. In addition, the conductive coating layer-containing porous polymer substrate itself shows excellent impregnatability with an electrolyte to ensure ion conductivity, thereby preventing an increase in resistance in the battery and degradation of battery performance.

In addition, the polymer fiber forming the porous polymer substrate may include high-density polyethylene, low-density polyethylene, linear low-density polyethylene, ultra-high-molecular weight polyethylene, polypropylene, polyethylene terephthalate, polybutylene terephthalate, polyester, polyacetal, polyamide (such as nylon 6), polycarbonate, polyimide, polyetheretherketone, polyethersulfone, polyphenylene oxide, polyphenylene sulfide, polyethylene naphthalate, polysulfone, polyvinylidene fluoride, polyacrylonitrile, polyetherimide, polyvinyl alcohol, polyethylene oxide, polyacrylic acid, polyvinyl pyrrolidone, agarose, alginate, polyvinylidene-hexafluoropropylene, polyurethane, or a mixture of at least two of them.

The conductive coating layer including the conductive material improves the conductivity of the electrode layer to reduce resistance of the electrode, thereby preventing degradation of battery performance. Particularly, in the case of a positive electrode as compared to a negative electrode having excellent conductivity of the negative electrode material, the positive electrode active material has low conductivity so that degradation of performance caused by an increase in electrode resistance may become serious. Therefore, it is advantageous to apply the conductive coating layer to a positive electrode in order to reduce resistance in the battery.

The conductive material may include carbon nanotubes, graphene, reduced graphene oxide, transition metal carbide (MXene), carbon black, acetylene black, Ketjen black, carbon fibers, polypyrrole, poly3,4-ethylenedioxythiophene, polyaniline, or a mixture of at least two of them.

Herein, 'graphene' refers to a polycyclic aromatic molecule formed by linkage of a plurality of carbon atoms through covalent bonding, wherein the carbon atoms linked through covalent bonding may form a 6-membered ring as a basic repeating unit, or may further include a 5-mebered and/or 7-membered ring. Therefore, a sheet formed of such graphene may be seen as a single layer of carbon atoms bound one another through covalent bonding, but is not limited thereto. The sheets formed of such graphene may have various structures, which may vary depending on the content of the 5-membered ring and/or 7-membered ring that may be contained in graphene. In addition, when the sheet formed of such graphene includes a single layer, such single layers may be stacked to form multiple layers, and the lateral end portion of the graphene sheet may be saturated with hydrogen atoms or not.

The term 'reduced graphene oxide' refers to graphene oxide having a reduced oxygen ratio through a reduction process. In a non-limiting embodiment, reduced graphene oxide may include oxygen at 1-30 at % as compared to carbon atoms, but is not limited thereto. Herein, 'graphene oxide' may include a structure in which an oxygen-containing functional group, such as carboxyl, hydroxyl or epoxy group, is bound onto a single layer of graphene, but is not limited thereto.

Since both the first support layer and the second support layer are conductive coating layer-containing porous polymer substrates according to an embodiment of the present disclosure, it is advantageous that the current collector is a porous current collector so that lithium ions may be freely transmitted through the current collector and transported to the opposite side of the counter electrode, when the counter electrode is positioned only at one side.

Figure 3:
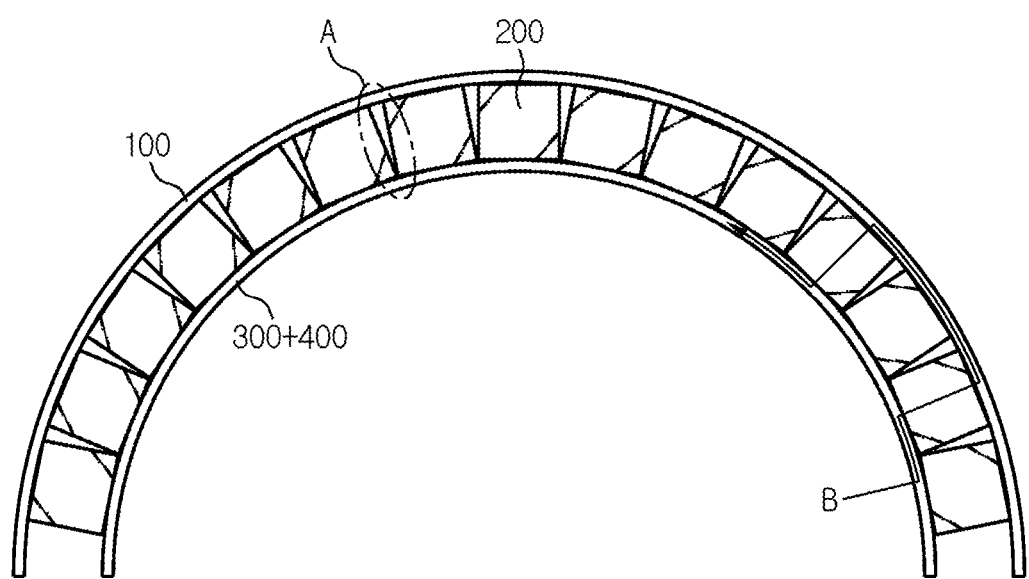
FIG. 3 shows a mechanism of minimizing an increase in electrode resistance upon bending of the electrode according to an embodiment of the present disclosure.

Referring to FIG. 3, in the electrode according to an embodiment of the present disclosure, the first support layer 100 includes a conductive coating layer-containing porous polymer substrate. Thus, it is possible to ensure flexibility even under a severe bending/folding condition, and to prevent detachment of the electrode layer 200. In addition, even when cracks (A) are generated on the electrode layer 200 in the electrode under a bending/folding condition, it is possible to provide excellent electron/ion conductivity in the electrode by virtue of the first support layer and the second support layer containing a conductive coating layer. Therefore, it is possible to minimize an increase in electrode resistance through electrical connection (B) between the electrode layers separated by the cracks.

In another aspect of the present disclosure, there is provided a method for manufacturing a flexible electrode, including the steps of:

applying electrode active material slurry to the top of a current collector, followed by drying, to form an electrode layer;

forming a first support layer at the top of the electrode layer; and forming a second support layer at the bottom of the current collector, wherein each of the first support layer and the second support layer is a conductive coating layer-containing porous polymer substrate.

The conductive coating layer-containing porous polymer substrate is obtained by spinning a polymer solution to form a porous polymer substrate including a plurality of polymer fibers and a pore structure interconnected by the polymer fibers, while spinning a colloidal solution containing a conductive material dispersed therein and a dispersing agent at the same time so that the conductive material may be positioned on the surface of the porous polymer substrate, thereby forming a conductive coating layer.

According to an embodiment of the present disclosure, the spinning rate of the polymer solution may be 2-15 μL/min and that of the colloidal solution may be 30-300 μL/min.

Herein, each of the methods for spinning the polymer solution and for spinning the colloidal solution containing the conductive material dispersed therein may independently use electrospinning, spray, electrospray, or a combination of two or more of them. For example, the same method or different methods may be used for spinning the polymer solution and for spinning the colloidal solution containing the conductive material dispersed therein. Herein, when the same method is used for spinning the polymer solution and for spinning the colloidal solution containing the conductive material dispersed therein, dual electrospinning, dual spray, dual electrospray, or a combination of two or more of them may be used.

The polymer solution may include 5-30 wt % of the polymer based on the total weight of the polymer solution.

According to an embodiment of the present disclosure, the colloidal solution may include a conductive material, a dispersion medium and a dispersing agent. The colloidal solution may include 0.1-50 wt % or 1-35 wt % of the conductive material based on the total weight of the colloidal solution. As described above, the content of the dispersing agent may be 0.1-20 parts by weight, 1-10 parts by weight, or 1-5 parts by weight, based on 100 parts by weight of the conductive material.

The dispersion medium may be at least one selected from the group consisting of deionized water, isopropyl alcohol, butanol, ethanol, hexanol, acetone, N,N-dimethylformamide, N,N-dimethyl acetamide, N-methyl pyrrolidone and combinations thereof.

Particular examples of the dispersing agent include polyvinyl pyrrolidone, poly3,4-ethylenedioxythiophene, polyacrylic acid, carboxymethyl cellulose, or at least two mixture of them.

To form an electrical network, the conductive coating layer-containing porous polymer substrate may include 10-50 wt % of a conductive material, preferably 20-40 wt % of a conductive material. When the content of the conductive material satisfies a range of 10-50 wt %, the conductive coating layer may be supported by virtue of such an adequate content of conductive coating layer-porous polymer substrate, the conductive coating layer-containing porous substrate can function as an electrode protective layer imparting flexibility of the battery, and formation of an electroconductive network in the conductive coating layer is facilitated to prevent the problem of an increase in internal resistance of the battery.

According to an embodiment of the present disclosure, the electrode layer may be formed merely on one side (e.g. top side) of the current collector, or both sides of the current collector may be provided with electrode layers by further carrying out a step of applying electrode active material slurry also to the other side (e.g. bottom side) of the current collector and drying the slurry to form an electrode layer.

In still another aspect of the present disclosure, there is provided a secondary battery including a positive electrode, a negative electrode, a separator interposed between the positive electrode and the negative electrode, and an electrolyte, wherein at least one of the positive electrode and the negative electrode is the above-described flexible electrode according to the present disclosure.

Herein, the secondary battery may be a general type of secondary battery, such as a stacked type, wound type or stacked/folded type secondary battery, as well as a special type of secondary battery, such as a flexible secondary battery.

Meanwhile, the flexible secondary battery according to the present disclosure includes: an internal electrode; a separator layer surrounding the outside of the internal electrode and preventing a short-circuit in the resultant electrode; and an external electrode surrounding the outside of the separator layer and formed by spiral winding, wherein at least one of the internal electrode and the external electrode is the above-described flexible electrode according to the present disclosure.

Herein, the term 'spiral' may be interchanged with 'helix', means a shape which winds diagonally in a certain range, and generally refers to a shape similar to the shape of a general spring.

Herein, the external electrode may have a strip structure extended in one direction.

In addition, the external electrode may be formed by spiral winding without any overlap. Herein, the external electrode may be formed by spiral winding without any overlap at an interval corresponding to 2 times or less of the width of the external electrode in order to prevent degradation of battery performance.

In addition, the external electrode may be formed by spiral winding with overlapped portions. Herein, the external electrode may be formed by spiral winding in such a manner that the overlapped portion may have a width corresponding to 0.9 times or less of the width of the external electrode in order to inhibit an excessive increase in internal resistance of the battery.

Meanwhile, the internal electrode may have a hollow structure having a space therein.

Herein, the internal electrode may include at least one spirally wound flexible electrode.

Additionally, an internal electrode current collector core portion may be formed in the space formed inside the internal electrode.

Herein, the internal electrode current collector core portion may be made of carbon nanotubes, stainless steel, aluminum, nickel, titanium, baked carbon or copper; stainless steel surface-treated with carbon, nickel, titanium or silver; aluminum-cadmium alloy; a non-conductive polymer surface-treated with a conductive material; or a conductive polymer.

In addition, a lithium ion-supplying core portion containing an electrolyte may be formed in the space formed inside the internal electrode.

Herein, the lithium ion-supplying core portion may include a gel polymer electrolyte and a support.

In addition, the lithium ion-supplying core portion may include a liquid electrolyte and a porous carrier.

Further, a filler core portion may be formed in the space formed inside the internal electrode.

The filler core portion may have various shapes, such as a wire, fiber, powder, mesh or foam, and may include materials for improving various performances of a flexible secondary battery, such as a polymer resin, rubber and inorganic material, other than the materials forming the internal electrode current collector core portion and lithium ion-supplying core portion.

Figure 5:
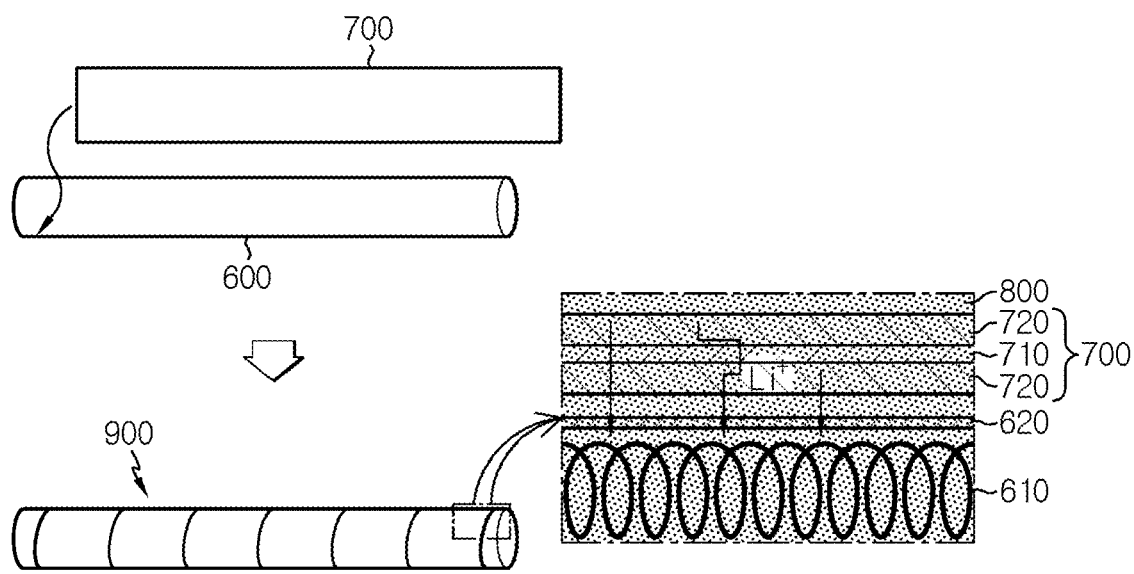
FIG. 5 is an exploded sectional view schematically illustrating a method for manufacturing the flexible secondary battery according to the present disclosure and the inner portion of the flexible secondary battery.

FIG. 5 is an exploded sectional view schematically illustrating a method for manufacturing the flexible secondary battery according to the present disclosure and the inner portion of the flexible secondary battery. Referring to FIG. 5, 'internal electrode 600 having a separator layer formed on the outside thereof' is prepared and an external electrode 700 is wound on the outside of the separator layer to obtain a flexible secondary battery 900. For example, the flexible secondary battery 900 may be provided with an internal electrode 610 having a spring-like shape and provided with an inner space, a separator layer 620, which is a separator or electrolyte layer wound or coated on the outside of the internal electrode 610, and an external electrode 700 wound spirally on the outside of the separator layer 620. The external electrode 700 may be the flexible electrode according to an embodiment of the present disclosure, may include a current collector 710 and electrode layers 720 formed on both sides of the current collector 710, and may further include a first support layer and a second support layer (not shown) on the outside of the electrode layer. An electrolyte may be injected to such a flexible secondary battery 900.

Herein, when the external electrode 700 is a positive electrode and the internal electrode 610 is a negative electrode, in the positive electrode, i.e. the wound external electrode 700, electrons are transported to the wire type current collector of the negative electrode, i.e. internal electrode 610, along the current collector and external circuit, while lithium ions are transported to the negative electrode 610 by way of the separator, i.e. separator 620, through the channel perpendicular to the current collector, during charge. In the case of discharge, the above-mentioned mechanism is realized in the opposite direction. In general, a positive electrode has low electroconductivity, and thus electroconductivity in the thickness direction is significantly degraded when the loading amount of the positive electrode layer is increased, resulting in an increase in electrode resistance and degradation of battery performance. In the case of a positive electrode, since a positive electrode active material has low electroconductivity, ion conductivity is significantly higher than electroconductivity. Thus, electrode resistance is determined by electroconductivity rather than ion conductivity of the electrode. Particularly, when positive electrode layers are provided on both surfaces of a porous current collector (e.g. meshed current collector having an open structure), about 0.5 times of electrode loading amount may be applied to both surfaces of the porous current collector, as compared to the same electrode loading amount of the electrode layer formed on a single surface of the porous current collector. In addition, since the porous current collector has an open structure, lithium ions can be transported freely through the structure. Thus, even when the counter electrode is positioned merely on one side of the porous current collector electrode, the electrode layers present on both surfaces of the porous current collector can participate in reaction and lithium ion transport at the region of positive electrode farthest away from the negative electrode may not have a significant effect upon electrode resistance. Therefore, when electrode layers are provided on both surfaces of the porous current collector having an open structure, it is possible to effectively reduce electrode resistance caused by a high electrode loading amount (or large electrode thickness).

Figure 6:
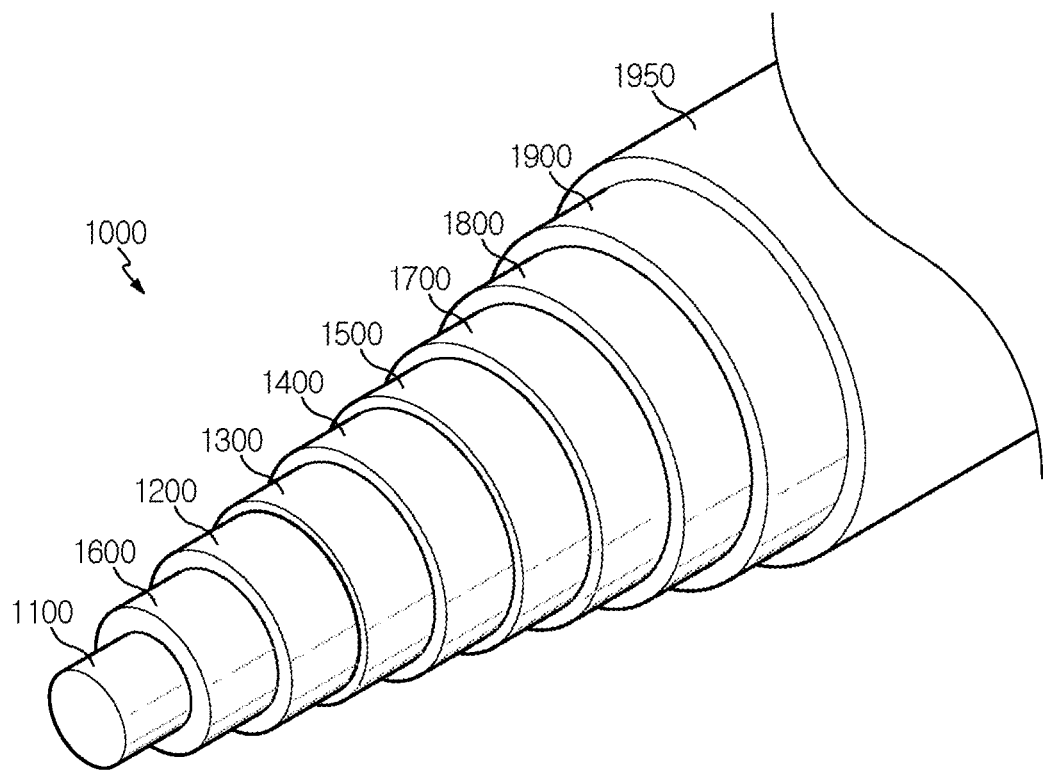
FIG. 6 is an exploded perspective view schematically illustrating the flexible secondary battery according to an embodiment of the present disclosure.

FIG. 6 is a schematic view illustrating the flexible secondary battery according to an embodiment of the present disclosure, wherein a sheet type internal electrode is wound on the outside of the lithium ion-supplying core portion 1100. FIG. 6 illustrates how the sheet type internal electrode is applied to a flexible secondary battery. The same is also applied to the sheet type external electrode wound on the outside of the separator layer as described hereinafter.

The flexible secondary battery according to an embodiment of the present disclosure includes: a lithium ion-supplying core portion containing an electrolyte; an internal electrode formed to surround the outside of the lithium ion-supplying core portion, and provided with a current collector and an electrode active material layer; a separator layer surrounding the outside of the internal electrode and preventing a short-circuit in the resultant electrode; and an external electrode surrounding the outside of the separator layer, formed by spiral winding, and provided with a current collector and an electrode active material layer, wherein at least one of the internal electrode and the external electrode is the above-described flexible electrode according to the present disclosure.

The flexible secondary battery according to an embodiment of the present disclosure may have a predetermined shape of horizontal section and a linear structure elongated along the longitudinal direction to the horizontal section. The flexible secondary battery according to an embodiment of the present disclosure has flexibility and thus allows free deformation. Herein, 'predetermined shape' means any shape not limited to a particular shape, and any shape may be used as long as it does not adversely affect the technical gist of the present disclosure.

In such flexible secondary batteries, FIG. 6 shows a flexible secondary battery 1000 to which the above-described flexible electrode is introduced as an internal electrode.

Referring to FIG. 6, the flexible secondary battery includes: a lithium ion-supplying core portion 1100 containing an electrolyte; an internal electrode formed to surround the outside of the lithium ion-supplying core portion; a separator layer 1700 surrounding the outside of the internal electrode; and an external electrode surrounding the outside of the separator layer 1700, formed by spiral winding, and provided with an external current collector 1900 and an external electrode active material layer 1800, wherein internal electrode includes an internal current collector 1200, an internal electrode active material layer 1300 formed on one surface of the internal current collector 1200, an organic/inorganic porous layer 1400 formed on the top of the internal electrode active material layer 1300 and containing inorganic particles and a binder polymer, a first support layer 1500 formed on the top of the organic/inorganic porous layer 1400, and a second support layer 1600 formed on the other surface of the internal current collector 1200.

As described above, the external electrode may be the sheet type flexible electrode according to the present disclosure, instead of the internal electrode, or both the internal electrode and the external electrode may include the sheet type flexible electrode according to the present disclosure.

Herein, the lithium ion-supplying core portion 1100 includes an electrolyte. Although there is no particular limitation in the electrolyte, particular examples of the electrolyte may include a non-aqueous electrolyte using ethylene carbonate (EC), propylene carbonate (PC), butylene carbonate (BC), vinylene carbonate (VC), diethyl carbonate (DEC), dimethyl carbonate (DMC), ethyl methyl carbonate (EMC), methyl formate (MF), γ-butyrolactone, sulfolane, methyl acetate (MA) or methyl propionate (MP); a gel polymer electrolyte using PEO, PVdF, PVdF-HFP, PMMA, PAN or PVAc; or a solid electrolyte using PEO, polypropylene oxide (PPO), polyethylene imine (PEI), polyethylene sulfide (PES) or polyvinyl acetate (PVAc); or the like. In addition, the electrolyte may further include a lithium salt, such as LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, lithium chloroborate, lithium lower aliphatic carboxylate or lithium tetraphenylborate. Further, the lithium ion-supplying core portion 1100 may include electrolyte alone. In the case of a liquid electrolyte, a porous carrier may be used.

Meanwhile, the internal electrode may be a negative electrode or positive electrode, and the external electrode may be a positive electrode or negative electrode corresponding thereto.

The electrode active material used in the above negative electrode or positive electrode is described as above.

In addition, the separator layer 1700 may use an electrolyte layer or separator.

As an electrolyte layer which becomes an ion channel, it is possible to use a gel polymer electrolyte using PEO, PVdF, PVdF-HFP, PMMA, PAN or PVAc; or a solid electrolyte using PEO, polypropylene oxide (PPO), polyethylene imine (PEI), polyethylene sulfide (PES) or polyvinyl acetate (PVAc); or the like. A matrix of solid electrolyte preferably includes a polymer or ceramic glass as fundamental backbone. In the case of a conventional solid electrolyte, ions may be transported too slowly in terms of reaction kinetics, even though ion conductivity is satisfied. Thus, it is preferred to use a gel polymer electrolyte facilitating ion transport as compared to a solid electrolyte. Since a gel polymer electrolyte does not have excellent mechanical properties, it may include a support to supplement this, and a support having a porous structure or crosslinked polymer may be used as such a support. Since the electrolyte layer according to the present disclosure can function as a separator, an additional separator may not be used.

The electrolyte layer according to the present disclosure may further include a lithium salt. Lithium salt can improve ion conductivity and reaction rate. Non-limiting examples of lithium salt include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, lithium chloroborate, lithium lower aliphatic carboxylate or lithium tetraphenylborate.

Although there is no particular limitation, the separator may be a porous polymer substrate made of a polyolefin polymer selected from the group consisting of an ethylene homopolymer, propylene homopolymer, ethylene-butene copolymer, ethylene-hexene copolymer and ethylene-methacrylate copolymer; a porous polymer substrate made of a polymer selected from the group consisting of polyester, polyacetal, polyamide, polycarbonate, polyimide, polyetherether ketone, polyether sulfone, polyphenylene oxide, polyphenylene sulfide and polyethylene naphthalate; a porous substrate formed of a mixture of inorganic particles and a binder polymer; or a separator provided with a porous coating layer formed of a mixture of inorganic particles and a binder polymer on at least one surface of the porous polymer substrate.

Herein, in the porous coating layer formed of a mixture of inorganic particles and a binder polymer, the binder polymer attaches the inorganic particles to one another (i.e. the binder polymer interconnects and fixes the inorganic particles) so that the inorganic particles may retain their binding states. In addition, the porous coating layer is bound to the porous polymer substrate by the polymer binder. The inorganic particles in the porous coating layer are present in a closely packed structure, while they are in contact with one another, and interstitial volumes formed in the inorganic particles that are in contact with one another become pores of the porous coating layer.

Particularly, in order to transport lithium ions of the lithium ion-supplying core portion easily to the external electrode, it is preferred to use a separator made of a nonwoven web corresponding to a porous polymer substrate made of a polymer selected from the group consisting of polyester, polyacetal, polyamide, polycarbonate, polyimide, polyetheretherketone, polyether sulfone, polyphenylene oxide, polyphenylene sulfide and polyethylene naphthalate.

In addition, the flexible secondary battery according to an embodiment of the present disclosure may further include a protective coating 1950. The protective coating 1950 is an insulator and is formed on the outside of the external current collector in order to protect the electrode from moisture in the air and external impact. As the protective coating, a conventional polymer resin having a water barrier layer may be used. Herein, the water barrier layer may include aluminum or a liquid crystal polymer having excellent water barrier property. The polymer resin that may be used includes PET, PVC, HDPE or epoxy resin.

In still another aspect of the present disclosure, there is provided a flexible secondary battery including two or more internal electrodes. The flexible secondary battery includes: two or more internal electrodes disposed in parallel with each other; a separator layer surrounding the outside of the two or more internal electrodes at once and preventing a short-circuit in the resultant electrode; and an external electrode surrounding the outside of the separator layer and formed by spiral winding, wherein at least one of the internal electrode and the external electrode is the above-described flexible electrode according to the present disclosure.

In yet another aspect of the present disclosure, there is provided a flexible secondary battery including two or more internal electrodes. The flexible secondary battery includes: two or more lithium ion-supplying core portions containing an electrolyte; two or more internal electrodes formed to surround the outside of each of the lithium ion-supplying core portions, provided with a current collector and an electrode active material layer, and disposed in parallel with each other; a separator layer surrounding the outsides of the two or more internal electrodes at once and preventing a short-circuit in the resultant electrode; and an external electrode surrounding the outside of the separator layer, formed by spiral winding, and provided with a current collector and an electrode active material layer, wherein at least one of the internal electrode and the external electrode is the above-described flexible electrode according to the present disclosure.

Figure 7:
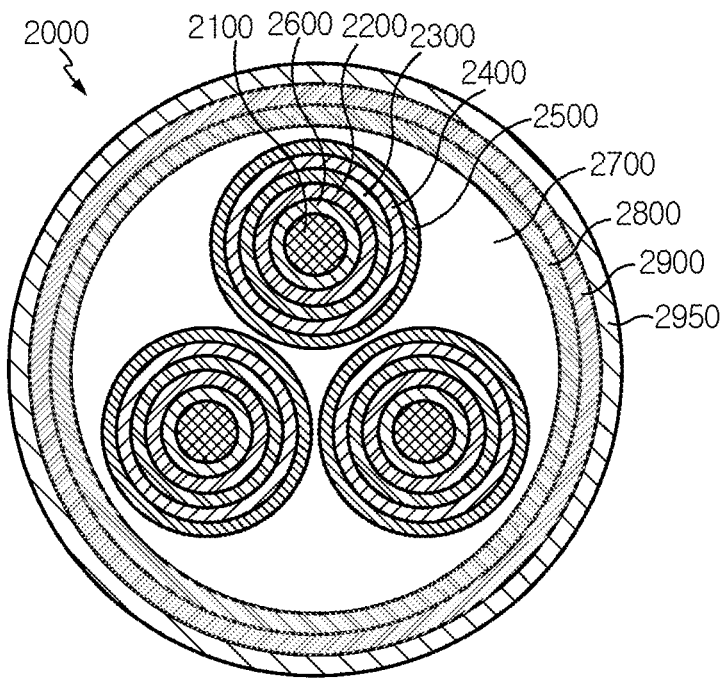
FIG. 7 is a schematic sectional view illustrating the flexible secondary battery including a plurality of internal electrodes according to an embodiment of the present disclosure.

In the flexible secondary batteries including two or more internal electrodes, FIG. 7 shows a flexible secondary battery 2000 to which the above-described flexible electrode is introduced as an internal electrode.

Referring to FIG. 7, the flexible secondary battery includes: two or more lithium ion-supplying core portions 2100 containing an electrolyte; two or more internal electrodes formed to surround the outside of each of the lithium ion-supplying core portions 2100, and disposed in parallel with each other; a separator layer 2700 surrounding the outsides of the two or more internal electrodes at once and preventing a short-circuit in the resultant electrode; and an external electrode surrounding the outside of the separator layer 2700, formed by spiral winding, and provided with an external current collector 2900 and an external electrode active material layer 2800, wherein the internal electrode includes an internal current collector 2200, an internal electrode active material layer 2300 formed on one surface of the internal current collector 2200, an organic/inorganic porous layer 2400 formed on the top of the internal electrode active material layer 2300 and containing inorganic particles and a binder polymer, a first support layer 2500 formed on the top of the organic/inorganic porous layer 2400, and a second support layer 2600 formed on the other surface of the internal current collector 2200.

As described above, the internal electrode or the external electrode may be the sheet type flexible electrode according to the present disclosure, or both the internal electrode and the external electrode may include the sheet type flexible electrode according to the present disclosure.

Since the flexible secondary battery 2000 includes an internal electrode having a plurality of electrodes, it is easy to control the loading amount of an electrode active material layer and battery capacity by adjusting the number of internal electrodes. In addition, since a plurality of electrodes are used, it is possible to prevent disconnection.

Meanwhile, it should be understood that the detailed description and specific examples, while indicating preferred embodiments of the disclosure, are given by way of illustration only, since various changes and modifications within the scope of the disclosure will become apparent to those skilled in the art from this detailed description.

Example 1

(1) Preparation of Electrode (Positive Electrode) Layer $LiCoO_2$ as a positive electrode active material, denka black as a conductive material, and polyvinylidene fluoride (PVdF) as a binder polymer were dispersed in N-methyl-2-pyrrolidone (NMP) as a solvent at a weight ratio of 80:5:15 to prepare positive electrode active material slurry. The positive electrode active material slurry was coated onto both surfaces of an aluminum (Al) foil current collector, followed by drying, to form positive electrode active material layers. In this manner, a positive electrode layer was prepared.

(2) Preparation of Polymer Solution

First, polyacrylonitrile (PAN) was used as a polymer for preparing a porous polymer substrate, and N,N-dimethyl formamide was used as a solvent for dissolving PAN. After polyacrylonitrile was added to N,N-dimethyl formamide, a polymer solution was prepared so that the content of polyacrylonitrile in the solution might be 10 wt %.

(3) Preparation of CNT-Dispersed Colloidal Solution

To prepare a dispersed colloidal solution containing a conductive material, carbon nanotubes (CNT) were used as a conductive material, and a co-solvent containing distilled water and isopropyl alcohol mixed at a weight ratio of 3:7 was used as a dispersion medium. Particularly, carbon nanotubes were added at 20 wt % of the dispersed colloidal solution, and polyvinyl pyrrolidone as a dispersing agent was added at 1 wt % based on the colloidal solution. Therefore, the content of the dispersing agent was 5 parts by weight based on 100 parts by wight of the conductive material.

(4) Manufacture of Electrode Using Dual Electrospinning

After introducing the polymer solution and the CNT-dispersed colloidal solution to an electrospinning system, the polymer solution and the colloidal solution were spun at a spinning rate of 6 μL/min and 65 μL/min, respectively, at the same time to one surface (dual electrospinning) of the electrode (positive electrode) layer prepared as described above for about 240 minutes. In this manner, a porous fibrous layer having a three-dimensional conductive structure, i.e. a first support layer as a conductive coating layer-containing porous polymer substrate was formed. Particularly, while the polymer solution was spun to form a porous polymer substrate having a porous structure interconnected by multiple polymer fibers, the colloidal solution containing the conductive material dispersed therein was further spun simultaneously with the spinning of the polymer solution so that the conductive material might be positioned on the surface of the porous polymer substrate, thereby forming a conductive coating layer.

Then, electrospinning was carried out on the surface opposite to the positive electrode to form a second support layer as a conductive coating layer-containing porous polymer substrate having the same structure, thereby providing a flexible electrode (positive electrode) including the first support layer and the second support layer, which are conductive coating layer-containing porous polymer substrates.

(5) Manufacture of Lithium Secondary Battery

The flexible electrode obtained as described above was used as a positive electrode to manufacture a lithium secondary battery.

To carry out an electrochemical performance test, an electrode including a graphite active material was used as a negative electrode, and polyethylene (Tonen 20 μm) was used as a separator.

A non-aqueous electrolyte was prepared by using ethylene carbonate (EC) and diethyl carbonate (DEC) mixed at a volume ratio of 1:1 as an organic solvent and dissolving $LiPF_6$ thereto to a concentration of 1M.

Particularly, the negative electrode was obtained by dispersing natural graphite as an active material, denka black as a conductive material and PVdF as a binder in NMP as a solvent at a weight ratio of 85:5:10 to prepare negative electrode active material slurry, and then coating the negative electrode active material slurry to a copper (Cu) foil current collector, followed by drying.

The obtained positive electrode, negative electrode and separator were introduced to form a pouch type cell, and the non-aqueous electrolyte was injected thereto to obtain a pouch type lithium secondary battery.

Comparative Example 1

A positive electrode was obtained by applying positive electrode active material slurry, containing $LiCoO_2$ as a positive electrode active material, denka black as a conductive material and PVdF as a binder dispersed in NMP as a solvent at a weight ratio of 80:5:15, to one surface of a sheet type current collector made of aluminum foil, followed by drying.

A pouch type lithium secondary battery was obtained in the same manner as described in Example 1, except that the obtained positive electrode was used.

Comparative Example 2

A positive electrode layer was formed on an aluminum foil current collector in the same manner as described in (1) of Example 1. Then, a solution prepared by dissolving 10 wt % of PVdF as a binder in NMP as a solvent was coated on the positive electrode and dried to obtain a positive electrode including a PVdF protective layer.

A pouch type lithium secondary battery was obtained in the same manner as described in Example 1, except that the obtained positive electrode was used.

Comparative Example 3

A positive electrode layer was formed on an aluminum foil current collector in the same manner as described in (1) of Example 1. Then, CNT and PVdF as a binder were dispersed in NMP as a solvent at 20 wt % and 80 wt %, respectively, to prepare a conductive coating solution in order to form a conductive coating layer containing a binder. The prepared solution was coated the positive electrode and dried to obtain a positive electrode including a conductive coating layer.

A pouch type lithium secondary battery was obtained in the same manner as described in Example 1, except that the obtained positive electrode was used.

Comparative Example 4

A positive electrode layer was formed on an aluminum foil current collector in the same manner as described in (1) of Example 1.

Then, the polymer solution and the CNT-dispersed colloidal solution prepared from (2) and (3) of Example 1 were introduced to an electrospinning system, and then the polymer solution and the colloidal solution were spun at a spinning rate of 6 μL/min and 65 μL/min, respectively, at the same time to one surface (dual electrospinning) of the electrode (positive electrode) layer prepared as described above for about 240 minutes. In this manner, a porous fibrous layer having a three-dimensional conductive structure, i.e. a first support layer as a conductive coating layer-containing porous polymer substrate was formed.

After that, only the polymer solution prepared from (2) of Example 1 was subjected to electrospinning to the other surface of the positive electrode layer at a spinning rate of 6 μL/min for about 240 minutes. In this manner, a second support layer free from a conductive coating layer including a porous polymer substrate alone was formed.

As a result, a positive electrode was obtained, wherein the first support layer, i.e. a conductive coating layer-containing porous polymer substrate, was positioned on one surface of the positive electrode layer, and the second support layer including a porous polymer substrate alone was positioned on the other surface of the positive electrode layer.

A pouch type lithium secondary battery was obtained in the same manner as described in Example 1, except that the obtained positive electrode was used.

Electrode Flexibility Test

Each of the positive electrodes according to Example 1 and Comparative Example 1 was prepared to have a width of 2 mm and a length of 150 mm, wound on a wire having a diameter of 1 mm, and the appearance was observed.

Figure 8:
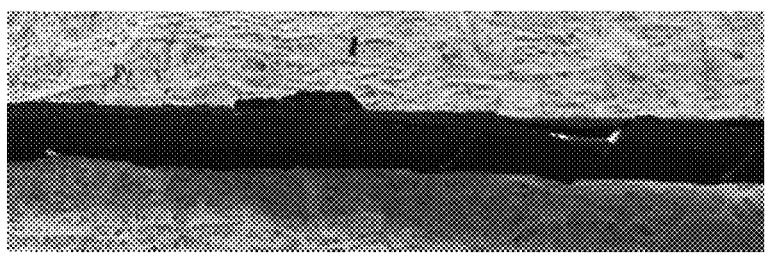
FIG. 8 and FIG. 9 are photographic views illustrating the electrodes according to Example 1 and Comparative Example 1, respectively, after winding each electrode around a wire having a diameter of 1 mm.
Figure 9:
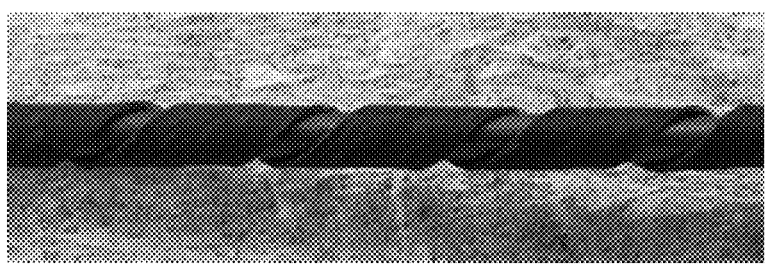

FIG. 8 and FIG. 9 are photographic views illustrating the electrodes according to Example 1 and Comparative Example 1, respectively, after being wound around a wire having a dimeter of 1 mm.

Referring to FIG. 9, in the case of Comparative Example 1, the electrode is broken and severe cracking occurs. However, referring to FIG. 8, no cracking occurs in Example 1 and it can be seen that a porous fibrous layer having a three-dimensional conductive structure well fixes the electrode active material layer. Thus, it can be seen from the above results that the flexible electrode according to an embodiment of the present disclosure shows significantly improved flexibility.

Evaluation of Charge/Discharge Characteristics

Each of the pouch type lithium secondary batteries according to Example 1 and Comparative Examples 2-4 was used to evaluate charge/discharge characteristics. During charge, each battery was charged to 4.2V at a current density of 0.5C in a constant current mode, maintained at 4.2V constantly in a constant voltage mode, and charging was finished when the current density reached 0.05C. During discharge, each battery was discharged to 3.0V at a current density of 0.5C in a constant current mode. Under the same conditions, 30 charge/discharge cycles were repeated.

Figure 10:
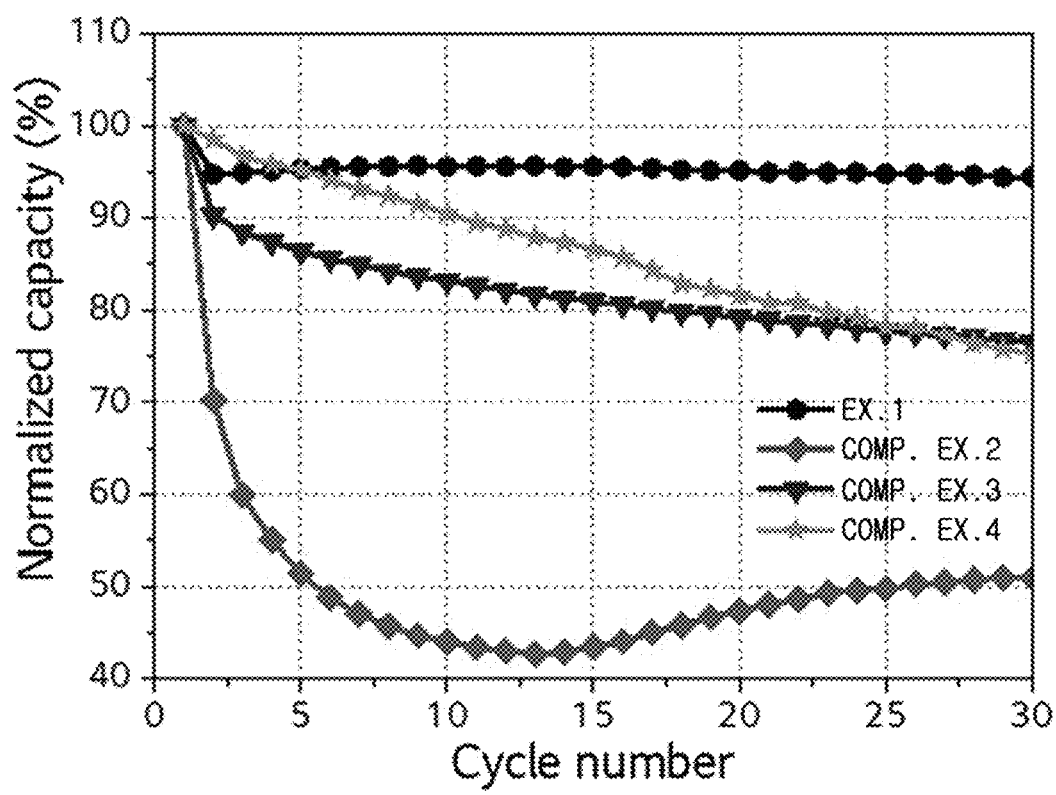
FIG. 10 is a graph illustrating the life characteristics of the pouch-type lithium secondary batteries according to Example 1 and Comparative Examples 2-4.

The results of life characteristics of each of the secondary batteries according to Example 1 and Comparative Examples 2-4 are shown in FIG. 10. In the case of Example 1, it shows significantly stable life characteristics as compared to Comparative Examples 2-4. On the contrary, Comparative Example 2 shows particularly poor battery performance. In the case of Comparative Example 2, it is difficult to introduce the electrolyte to the electrode active material layer, since no conductive material is incorporated and no pores are formed, and thus it can be seen that the electrode layer functions as resistance to cause degradation of battery performance. In addition, in the case of Comparative Example 4, it includes a porous polymer substrate, wherein the second support layer positioned on one surface of the electrode merely has a porous structure and no conductive coating layer is provided. Thus, it can be seen that the porous fibrous layer forming the porous polymer substrate functions as a resistance element in the electrode to cause degradation of the life characteristics of the battery.

What is claimed is:

1. A flexible electrode, comprising:
   a current collector;
   an electrode layer positioned at a top of the current collector;
   a first support layer positioned at a top of the electrode layer;
   a second support layer positioned at a bottom of the current collector; and
   a second electrode layer between the current collector and the second support layer, wherein the electrode layer and the second electrode layer are electrically coupled to the current collector,
   wherein each of the first support layer and the second support layer is a conductive coating layer-containing porous polymer substrate including:
      a porous polymer substrate, and a conductive coating layer positioned on a surface of the porous polymer substrate and comprising a conductive material and a dispersing agent, and
      the porous polymer substrate is a non-woven web provided with a plurality of polymer fibers and a pore structure interconnected by the plurality of polymer fibers.

2. The flexible electrode according to claim 1, wherein the current collector is a porous current collector, or a current collector having a plurality of dented portions having a continuous or discontinuous pattern.

3. The flexible electrode according to claim 1, wherein the plurality of polymer fibers comprises polyethylene terephthalate, polyimide, polyamide, polysulfone, polyvinylidene fluoride, polyacrylonitrile, polyethylene, polypropylene, polyetherimide, polyvinyl alcohol, polyethylene oxide, polyacrylic acid, polyvinyl pyrrolidone, agarose, alginate, polyvinylidene hexafluoropropylene, polyurethane, polypyrrole, poly3,4-ethylenedioxythiophene, polyaniline, a derivative thereof, or a mixture of two or more thereof.

4. The flexible electrode according to claim 1, wherein the conductive material comprises carbon nanotubes, graphene, reduced graphene oxide, transition metal carbide, carbon black, acetylene black, Ketjen black, carbon fibers, polypyrrole, poly3,4-ethylenedioxythiophene, polyaniline, or a mixture of two or more thereof.

5. The flexible electrode according to claim 1, wherein a content of the dispersing agent is 0.1-20 parts by weight based on 100 parts by weight of the conductive material.

6. A method for manufacturing the flexible electrode of claim 1, comprising the steps of:
   applying electrode active material slurry to the top of the current collector, followed by drying, to form the electrode layer;
   forming the first support layer at the top of the electrode layer; and
   forming the second support layer at the bottom of the current collector,
   wherein each of the first support layer and the second support layer is the conductive coating layer-containing porous polymer substrate obtained by:
      spinning the polymer solution to form the porous polymer substrate comprising the plurality of polymer fibers and the pore structure interconnected by the plurality of polymer fibers, while spinning a colloidal solution containing the conductive material dispersed therein and the dispersing agent at the same time so that the conductive material may be positioned on a surface of the porous polymer substrate, thereby forming the conductive coating layer.

7. The method for manufacturing a flexible electrode according to claim 6, which further comprises a step of applying electrode active material slurry to the bottom of the current collector, followed by drying, to form an electrode layer, before forming the second support layer at the bottom of the current collector.

8. A secondary battery comprising a positive electrode, a negative electrode, and a separator interposed between the positive electrode and the negative electrode, wherein at least one of the positive electrode and the negative electrode is the flexible electrode as defined in claim 1.

9. The secondary battery according to claim 8, which is a stacked battery, a wound battery, a stacked/folded battery, or a flexible battery.

10. A flexible secondary battery comprising:
    an internal electrode;
    a separator layer surrounding an outside of the internal electrode; and
    an external electrode helically wound to surround an outside of the separator layer,
    wherein at least one of the internal electrode and the external electrode is the flexible electrode as defined in claim 1.

11. The flexible secondary battery according to claim 10, wherein the flexible electrode has a strip structure extended in one direction.

12. The flexible secondary battery according to claim 10, wherein the internal electrode has a hollow structure having a space therein.

13. The flexible secondary battery according to claim 10, wherein the internal electrode comprises at least one flexible electrode wound helically.

14. The flexible secondary battery according to claim 12, wherein an internal electrode current collector core portion, a lithium ion-supplying core portion containing an electrolyte, or a filler core portion is formed in the space formed inside the hollow structure of the internal electrode.

15. The flexible secondary battery according to claim 12, wherein a lithium ion-supplying core portion containing an electrolyte is formed in the space formed inside the hollow structure of the internal electrode, and the lithium ion-supplying core portion comprises a gel polymer electrolyte and a support, or a liquid electrolyte and a porous carrier.

16. The flexible secondary battery according to claim 10, which further comprises a protective coating formed to surround an outside of the external electrode.

17. A flexible secondary battery, comprising:
    a lithium ion-supplying core portion containing an electrolyte;
    an internal electrode formed to surround an outside of the lithium ion-supplying core portion;
    a separator layer surrounding an outside of the internal electrode; and
    an external electrode helically wound to surround an outside of the separator layer,
    wherein at least one of the internal electrode and the external electrode is the flexible electrode as defined in claim 1.

18. A flexible secondary battery, comprising:
    two or more internal electrodes disposed in parallel with each other;

a separator layer surrounding an outside of the two or more internal electrodes at once; and an external electrode helically wound to surround an outside of the separator layer, wherein at least one of the two or more internal electrodes and the external electrode is the flexible electrode as defined in claim 1.

19. A flexible secondary battery, comprising:

two or more lithium ion-supplying core portions each containing an electrolyte;

two or more internal electrodes formed to surround an outside of the two or more lithium ion-supplying core portions, respectively, the two or more internal electrodes disposed in parallel with each other;

a separator layer surrounding the outsides of the two or more internal electrodes at once; and an external electrode helically wound to surround an outside of the separator layer, wherein at least one of the two or more internal electrodes and the external electrode is the flexible electrode as defined in claim 1.

\* \* \* \* \*